Oct. 14, 1947.  E. R. PRICE  2,429,195
BRAKE ACTUATING SYSTEM
Filed July 7, 1944  3 Sheets-Sheet 3
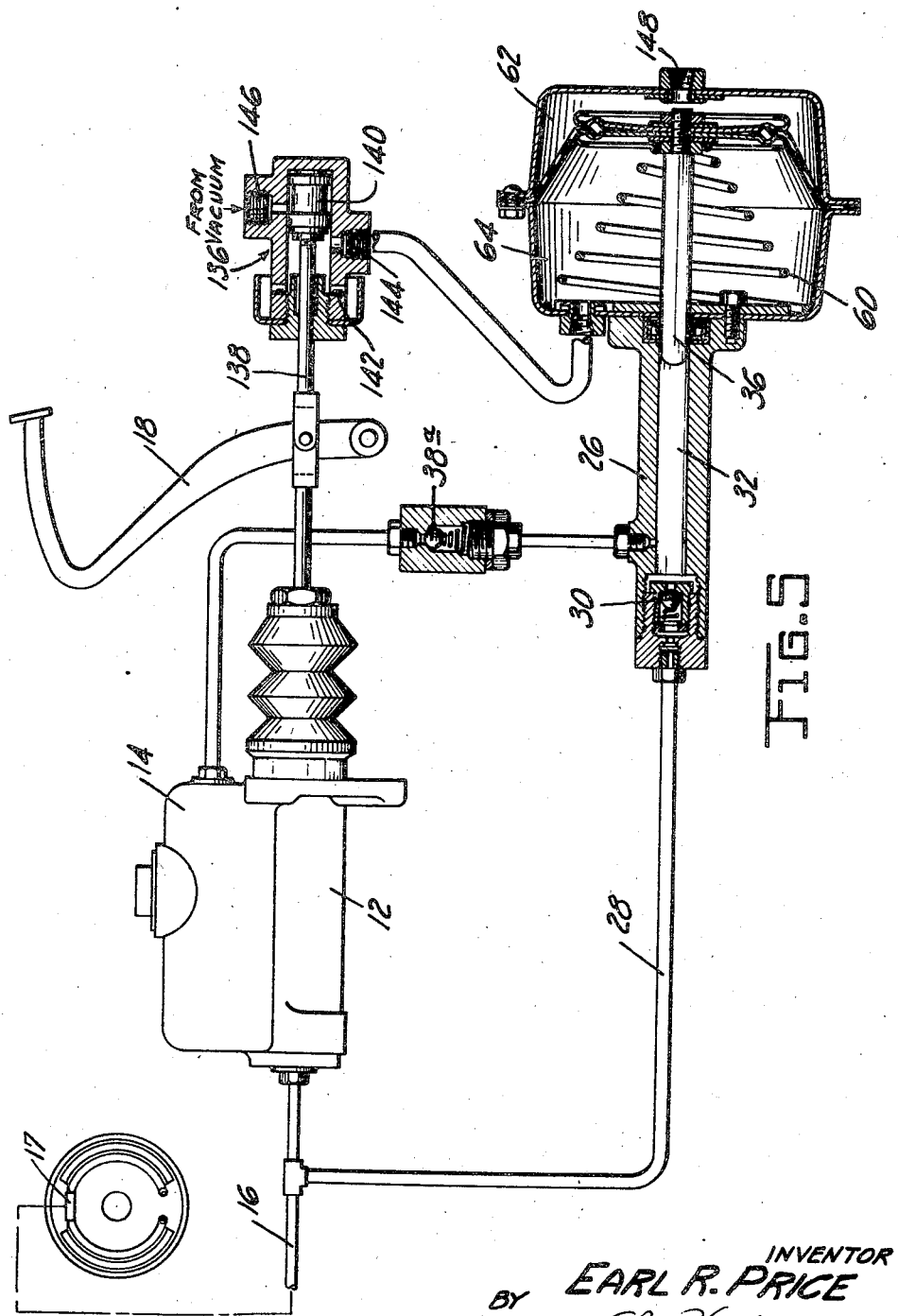
INVENTOR
EARL R. PRICE
BY
T. J. Plante
ATTORNEY Patented Oct. 14, 1947

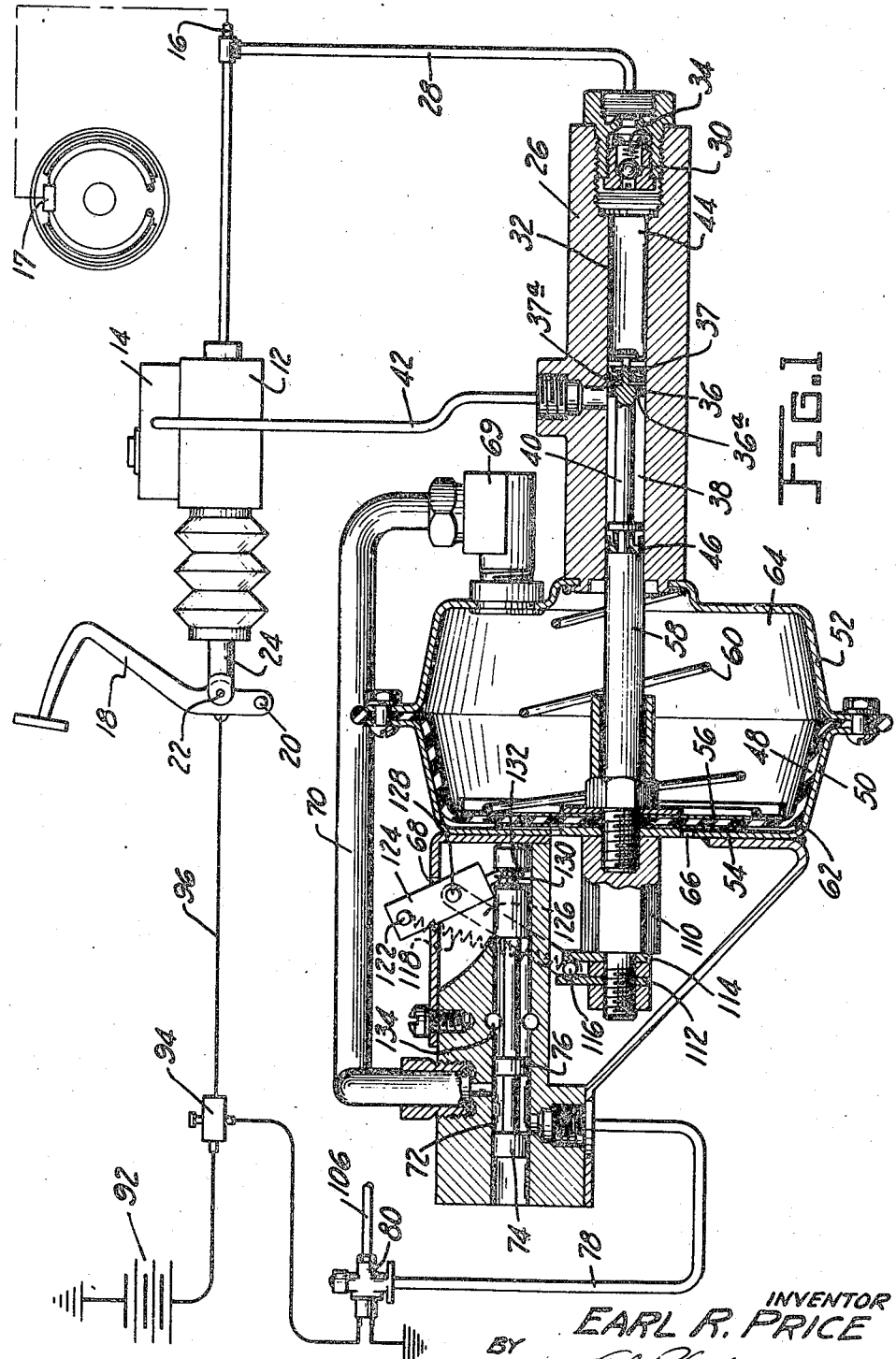

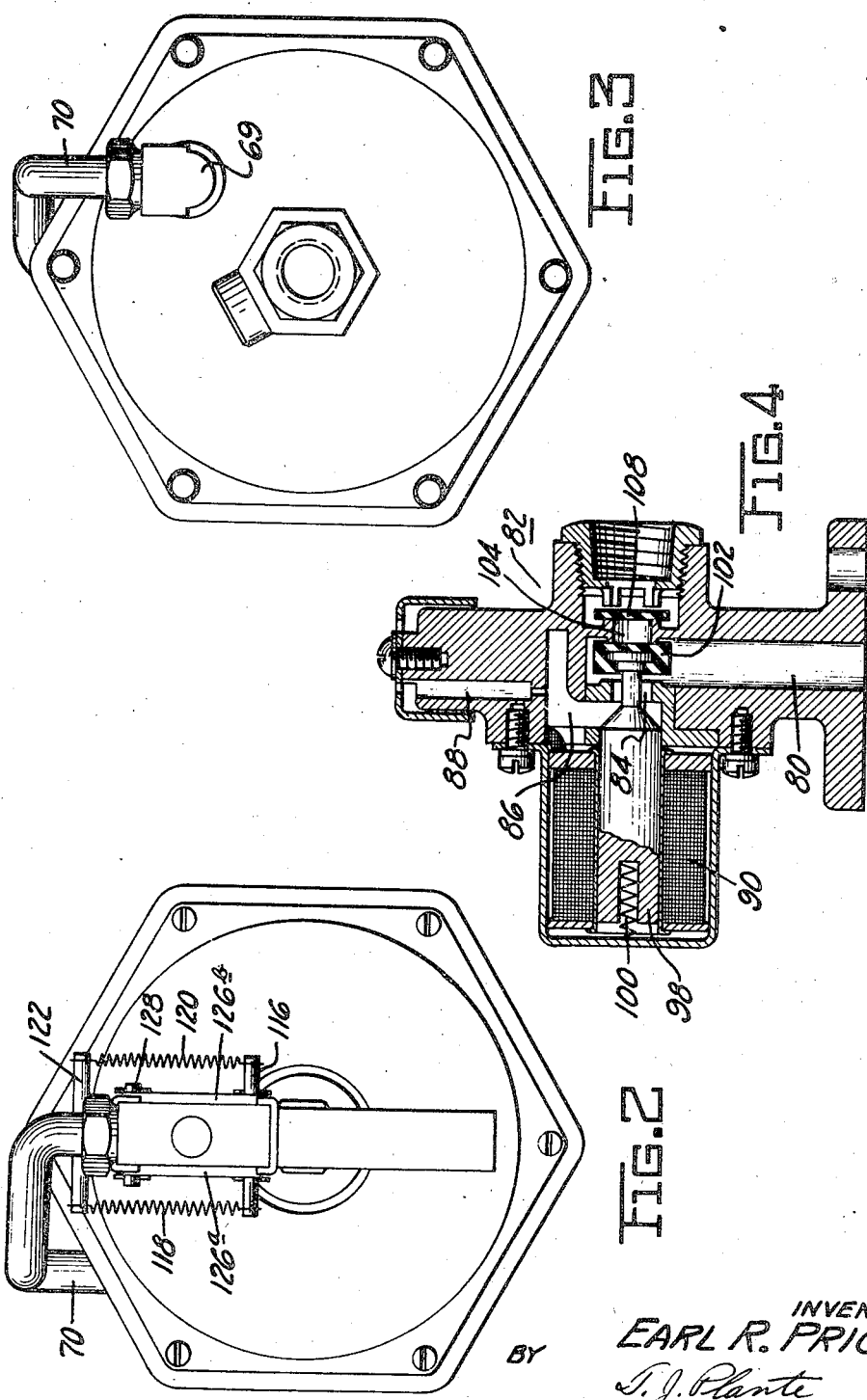

2,429,195

UNITED STATES PATENT OFFICE 2,429,195

BRAKE ACTUATING SYSTEM

Earl R. Price, South Bend, Ind., assignor to Bendix Aviation Corporation, South Bend, Ind., a corporation of Delaware Application July 7, 1944, Serial No. 543,903

8 Claims. (Cl. 188—152)

This invention relates to brake actuating systems.

An object of the invention is to provide means for positively insuring against loss of pedal and failure of brakes due to excessive shoe displacement requirements. It is proposed that the normal brake application be accomplished in the usual way, and that the means for positively insuring against brake failure be operative only under certain unusual and generally unexpected circumstances.

A further object of the invention is to make it possible either to obtain an increased pedal ratio, thereby reducing the pedal pressure necessary to create a given line pressure, or to lower the pedal and thereby make it more convenient to operate, without incurring any danger of bottoming the pedal, or, in other words, without incurring any danger of brake failure due to lack of sufficient available pedal travel.

A still further object of the invention is to provide power means for displacing additional fluid under pressure to brake actuating cylinders of a hydraulic braking system only in the event pedal movement beyond a predetermined distance fails to accomplish full brake application. With this arrangement, it is possible to use a relatively small and inexpensive power device, which is only operable under unusual circumstances, to obtain, in effect, much the same advantages that might be derived from any other type of power device.

Other objects and advantages of the present invention will become apparent during the course of the following description, reference being had therein to the accompanying drawings, in which:

Figure 1 shows in vertical section a power operated device for forcing additional fluid into a hydraulic brake system which is diagrammatically illustrated;

Figure 2 is a side elevation showing the left end of the power operated device of Figure 1;

Figure 3 is a side elevation showing the right end of the power operated device of Figure 1;

Figure 4 shows in section the valve which operates the power device of the preceding figures; and Figure 5 is a view showing part in section and part diagrammatically a second embodiment of my invention.

Broadly speaking, it is proposed to provide, in combination, power means for forcing additional fluid into a hydraulic system to supplement the fluid normally displaced therein, and means responsive to a predetermined movement of the operator operated member, such as the pedal, for actuating the power means to increase the fluid in the hydraulic system.

Referring to the embodiment illustrated in Figures 1 to 4, a conventional master cylinder 12 is shown, provided with the usual reservoir 14, and connected by means of a fluid-carrying conduit 16 to the usual brake actuating cylinder or cylinders 17. The brake actuating cylinders to which the conduit 16 is connected require a displacement of fluid sufficient to force the brake shoes into contact with the brake drum and hold the shoes pressed against the drum regardless of any drum expansion or give. Although shoe brakes are used in explaining operation of the device, the principles of the invention are equally applicable to any other type of hydraulically actuated brake mechanism, such as disc brakes, cone brakes and the like. The amount of displacement required at any given time to satisfactorily operate the brake actuating cylinders and effectively apply the brakes depends upon several factors, including the brake adjustment, which determines the distance the brake shoes have to move before they come into contact with the drum, and the amount of drum expansion due to pressure or heat or both. Particularly after a series of relatively heavy brake applications, the drums are likely to become excessively hot and to expand considerably, with the result that an appreciably greater amount of fluid is required in order to bring the shoes into contact with the respective drums and obtain braking pressure.

The operator operated control for the master cylinder 12 may comprise the usual brake pedal 18, pivoted at 20, and connected at 22 to a rod 24 which extends into master cylinder 12 to contact the piston therein, and to push said piston to the right whenever the pedal 18 is depressed.

The total available travel of the pedal 18 is, of course, limited. Furthermore, a portion of that travel must be retained as pedal reserve, to allow for brake applications requiring an excessive amount of fluid displacement due to drum expansion or insufficient brake adjustment or the like.

I have provided means for forcing additional fluid to the brake actuating cylinders to compensate for such variations in displacement requirements, thereby making the amount of pedal reserve less critical.

An auxiliary master cylinder or pump 26 is connected by means of a conduit 28 with the conduit 16. A one way valve 30 is arranged to prevent flow of fluid from conduits 16 and 28 to the bore 32 of the auxiliary master cylinder or injector 26, but to permit the flow of fluid from the bore 32 to conduits 28 and 16. A light spring 34 may bias the valve 30 to closed position. A piston 36, having a sealing cup 37, is reciprocable in the bore 32. An annular chamber 38, formed between the bore and the reduced diameter portion 40 of piston 36 is constantly in communication with a fluid supply source, such as the reservoir 14 of master cylinder 12, with which it is shown connected by conduit 42. The sealing cup 37, in effect, acts as a one-way check valve. When piston 36 moves on its pressure stroke toward the right the lips of the sealing cup prevent any flow of fluid from the chamber 44 ahead of the piston to the chamber 38 at the rear of the piston. However, on the return stroke of the piston 36 toward the left, a vacuum is momentarily created in chamber 44 which draws fluid from chamber 38 past the lip of sealing cup 37 to refill chamber 44, the reduced portion 40 of the piston 36 being of sufficient length that chamber 38 is always in communication with the reservoir 14. The flow of fluid from the rear to the front of piston 36 and sealing cup 37 may be facilitated by holes 36a in the piston and a washer 37a between the piston and cup. A sealing cup 46 is provided at the rear of reduced portion 40 of the piston in order to prevent escape of fluid from the auxiliary master cylinder 26.

Power means are provided for exerting a pressure on piston 36 to force fluid into the hydraulic system (represented by conduit 16). Any suitable type of power means may be used for this purpose. In the illustration, I have shown a differential air pressure device of the diaphragm type, a flexible diaphragm 48 having its peripheral portion clamped between the shells 50 and 52 of a power cylinder. The central portion of diaphragm 48 is clamped between plates 54 and 56, and the diaphragm assembly is mechanically connected by means of rod 58 with piston 36 to actuate the same. A return spring 60 normally retains the diaphragm assembly and piston 36 in released position, or to the left as shown in Figure 1.

Normally, both chamber 62 at the left of diaphragm 58 and chamber 64 at the right of diaphragm 58 have the same pressure conditions prevailing therein. For example, if the source of power is to be air at atmospheric pressure acting against vacuum, the chambers 62 and 64 may be connected, when the power cylinder is inactive, to air at atmospheric pressure. Chamber 62 is shown open to air by means of the opening 66 at the left end of the power cylinder and opening 68 in the casing which encloses the valve mechanism adapted to control the operation of the power cylinder. Chamber 64 is normally connected to air at atmospheric pressure by a fitting 69 (see Fig. 3) which connects it through a pipe 70 with an annular chamber 72 which is formed between the full diameter portions 74 and 76 of a spool valve. Chamber 72 communicates through conduit 78 with port 80 of a control mechanism indicated generally at 82. In the illustrated position of the parts of control mechanism 82, port 80 communicates through opening 84, chamber 86, and passage 88 with the atmosphere.

The control mechanism 82 may be actuated by means of an electrical circuit. This circuit includes the solenoid coil 90, a source of electric power such as the battery 92, and a control switch 94, the solenoid coil being grounded at the control mechanism 82. The arrangement of control switch 94 is such that a predetermined movement of pedal 18 by the operator will close the switch to make the electric circuit and energize the solenoid 90. The pedal 18 may be connected with switch 94 to actuate the same by means of a rod or wire 96. Obviously, the exact location and method of actuation of this switch 94 is not important. The only requisite is that closing of the switch occurs after a predetermined pedal movement.

In operation, the operator depresses the pedal, forcing fluid from master cylinder 12 through conduit 16 to the brake actuating cylinders. If sufficient fluid has been displaced to actuate the brakes and stop the vehicle before the pedal has moved the predetermined distance to close switch 96, then the automatic mechanism for injecting fluid into the hydraulic system will not be caused to operate. The distance at which the switch 94 is closed is a matter of choice. In other words, the switch may be set to close after relatively short movement of the pedal, or it may be set to close only when the pedal has moved almost to the floor board. Probably the latter will be preferable in most cases, since it will in most cases be desirable to apply the brakes by normal means only, and to bring the power operated injector system into operation only in unusual cases.

When the distance of movement of pedal 18 is sufficient to close switch 94, the electrical circuit is made, and solenoid 90 is energized. This will draw the solenoid armature 98 to the left against the relatively weak resistance of a very light spring 100. This causes the double acting or two-sided poppet valve 102 to open port 104, thereby connecting passage 80 with conduit 106 which is in communication with a vacuum source, such as the intake manifold. Also, the double acting poppet 102 will block port 84, cutting off the atmospheric connection. Incidentally, a check valve 108 may be provided in the vacuum line to permit air to be drawn from passage 80 to the vacuum source, as long as the pressure in the vacuum source is lower than the pressure in passage 80, but to prevent air from being drawn in the reverse direction in case the vacuum at the source falls below that in the power cylinder.

Opening vacuum port 104 causes the air in chamber 64 to be withdrawn, reducing the pressure in said chamber and creating a pressure differential over diaphragm 48 which causes the diaphragm assembly to move toward the right, pushing piston 36 ahead of it. Assuming the pressure created by piston 36 is greater than the pressure in the hydraulic system, valve 30 will be forced open and the amount of fluid in the system will be increased. In order to be certain that the pump 26 will operate satisfactorily whenever its operation is necessary, the power means should be capable of creating a unit pressure in the auxiliary pump fluid chamber 44 at least as great as the maximum unit pressure present in the hydraulic system needed to obtain maximum deceleration when the brakes are fully applied. In addition, a small safety factor should be added. Above this, there is no reason for increasing the pressure capacity of the power device and pump, since the pump only displaces fluid into the hydraulic system and does not assist the operator in building pressure therein. Regardless of operation of the power device and pump, the operator must produce the entire pressure manually. The object of the power device and pump is simply to assure against brake failure due to a lack of fluid in the system.

In the device shown in Figure 1, in order that the power cylinder may be relatively small, I have made the power mechanism automatically reversible so that it will continue to stroke until sufficient fluid has been displaced into the system. To accomplish this a reversing valve mechanism is used.

As the diaphragm assembly moves toward the right in Figure 1, it carries with it the rear extension 110. The extension 110 has a pair of collars 112 and 114 which retain a transversely extending rod 116 (see also Fig. 2). A pair of tension springs 118 and 120 at opposite ends of rod 116 connect the same to a similar rod 122 which is pivoted on link 124 of a valve reversing toggle mechanism. The second link 126 of the toggle mechanism, which may include identical struts 126a and 126b located at opposite sides of the link 124, is secured at its lower end to rod 116 and at its upper end to a common pivot point for link 124 and links 126a and 126b by means of a pin 128 which is anchored in the valve casing. The lower end of link 124 has a point 130 extending into a slot 132 formed in the spool slide valve which controls operation of the power cylinder. In the position shown the effect of springs 118 and 120 is to exert a force through the point 130 of link 124 urging the spool slide valve toward the right, i. e., holding it in the position shown. However, when the rear extension 110 on the diaphragm assembly has moved sufficiently far to the right to bring the pivot points 122, 128 and 116 of the toggle mechanism into line, and subsequently to bring them slightly out of line in the opposite direction, the force of springs 118 and 120, instead of trying to rotate link 124 counterclockwise, will cause said link to rotate clockwise about pivot 128, with the result that the slide valve will be forced to the left, causing portion 76 to cut off communication between pipe 70 and conduit 78, and thereafter to open communication between said pipe 70 and atmosphere ports 134. This will result in an inflow of air to chamber 64 equalizing the pressure in chambers 62 and 64, and permitting spring 60 to return the diaphragm assembly to its leftward or released position. However, as the extension 110 of the diaphragm assembly once more moves to the left, it will once again cause the toggle mechanism of the valve to pass dead center, and return the valve to the position shown, wherein conduit 78 and pipe 70 will again be interconnected, and the atmosphere will be evacuated from chamber 64 to cause another stroke of the diaphragm and pump. This will continue until control switch 94 is again opened by return of the pedal to a position slightly nearer released position.

During each pressure stroke of the pump 26 fluid is forced from bore 32 past valve 30 into the hydraulic system, while on each return stroke fluid is drawn from reservoir 14 past cup 37 into bore 32.

Figure 5 illustrates a second embodiment of my invention. In this embodiment, movement of pedal 18 beyond the predetermined distance, instead of closing an electrical switch, directly operates a three-way valve 136. A rod 138 connects the pedal to a valve member 140, which, in the position shown, permits communication of air through atmospheric port 142 with chamber 64 of the power device through port 144. Movement of the pedal causes movement of valve member 140, and, when the pedal has moved beyond the predetermined distance required for operation of the power injector, valve member 140 begins to cut off port 144 from atmosphere port 142 and to connect port 144 with vacuum port 146. This causes air to be gradually evacuated from chamber 64 of the power device. Since chamber 62 at the opposite side of diaphragm 48 is at all times open to atmosphere through port 148, the evacuation of air from chamber 64 creates a pressure differential over the diaphragm which, acting against return spring 60, moves piston 36 on its pressure stroke in the bore 32 of the auxiliary master cylinder or injector cylinder 26, displacing fluid past check valve 30 into conduits 28 and 16 (representing the hydraulic system). On the return stroke of piston 36, fluid is drawn into bore 32 past check valve 38a from reservoir 14 of the pedal operated master cylinder 12. The arrangement of Figure 5 has an advantage over that of Figure 1 in that it operates more smoothly, and tends to avoid a sudden surge of fluid acting against the pedal and tending to push up on the operator's foot. In the device of Figure 1, closing the electric switch 94 immediately brings the power operated pump into full operation. It is impossible for the switch to be partially closed or partially effective, and full connection between chamber 64 and the vacuum source is made immediately upon closing the switch. In the device of Figure 5, air can be, in effect, bled past valve member 140 to create smoothly the pressure necessary to put additional fluid into the hydraulic system. As soon as valve member 140 slightly uncovers the right edge of port 144 to connect it to vacuum, air will begin to bleed from chamber 64, but the rate of evacuation of air depends upon the amount of opening of the valve, and chamber 64 will not be fully open to vacuum through port 144 unless the pedal is forced unnecessarily far. This will not usually be the case, since the power injector will act fast enough to prevent the pedal from fully opening the port 144.

In this embodiment the displacement of fluid in one complete stroke of the power device is sufficient for any emergency needs. However, if the pedal is maintained at or near the position at which the power injector is brought into operation for an appreciable time, it is possible for the power device to stroke more than once, since an almost imperceptible return of the pedal after chamber 64 has been connected through a small opening to the vacuum source, might cause chamber 64 to be again connected to atmosphere and partly released. If the valve should again be moved slightly to reopen the vacuum connection, a second stroke of piston 36 would occur.

From the above description it will be apparent that the principle of operation of my automatic reserve compensator is somewhat different from that of power devices heretofore used. In most cases power devices have been used simply as assistors which increase the pressure in the brake actuating system. In other cases power devices have been used to initially take up the slack or, in other words, move the shoes into contact with the drum, allowing the manually created pressure of the operator to build the actual friction creating pressure.

Devices based on the principles of the present invention have the advantage that the operation of the power means does not enter into the normal brake application. Consequently a less expensive and less complicated power device can be used. Since the occasions on which operation of the power device is required really constitute only a small percentage of total brake operations on passenger cars and small trucks, it may not be necessary to provide a power device which operates with every brake application. However, the relatively few instances in which the brakes may fail due to lack of sufficient displacement of hydraulic fluid are extremely important because of the tremendous danger involved. My automatic reserve compensator is particularly designed to take care of the emergencies without interfering with otherwise normal brake application.

As mentioned heretofore, the conventional hydraulic brake actuating system is so designed as to allow a relatively large pedal reserve to take care of situations in which the fluid displacement required is greater than usual. By eliminating all danger of brake failure due to lack of pedal reserve, I make it possible to accomplish several improvements in hydraulic brake actuating systems, without incurring any disadvantages. The ratio of line pressure to pedal pressure may be increased, by such means as lengthening the lever arm against which the operator applies his force, in order to reduce the pedal pressure required to obtain a desired line pressure, without lengthening the pedal stroke. On the other hand, if desired, the pedal stroke may be reduced, without requiring the operator to exert any greater pressure to obtain a given line pressure than he exerts with the full pedal stroke of the conventional hydraulic system. Thus, the released position of the brake pedal could be closer to the floor board of the vehicle, increasing the room for the operator's leg, and possibly bringing the brake pedal into approximately the same height as the accelerator pedal in order that the operator could move the ball of his foot from one to the other by simply pivoting his heel on the floor board.

At any rate, my invention makes it possible to reduce pedal pressure, or to reduce pedal stroke, or partially to reduce both of them, whichever is most desirable in the particular case.

In addition, my invention serves to warn the operator when the brakes need adjusting. When the reserve compensator comes into operation it is usually an indication that the shoe movement is excessive.

An important advantage of the present invention over the slack-take-up type of device in which a power device moves the shoes into contact with the drum to conserve pedal travel, lies in the fact that such devices necessitate an extremely rapid operation of the power device in order to complete the slack-take-up stage before the final high pressure stage begins. With such arrangements, jumping on the pedal too often causes the first stage to be missed, because the resistance in the lines permits a high pressure to be built up immediately. The result may be a brake failure due to insufficient pedal travel.

With my device this result cannot occur, since the power device is adapted to operate at the end of the pedal stroke.

The initial slack-take-up device also has the disadvantage that it operates in the same manner regardless of need.

Although particular embodiments of my invention have been described, it will be understood by those skilled in the art that the objects of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. For use in a hydraulic braking system having brake actuating cylinders, a master cylinder in communication therewith, and a pedal for operating the master cylinder to displace fluid to the brake actuating cylinders, the combination of a normally idle power means adapted when actuated to force additional fluid into the hydraulic system to supplement the fluid displaced from the master cylinder, the fluid in said power means being only under atmospheric pressure during the time the power means is idle, and means responsive to a predetermined movement of the pedal for actuating the power means to increase the fluid in the hydraulic system, the power means being brought into operation by the pedal movement responsive means only after a pedal movement greater than that which is normally sufficient to displace enough fluid from the master cylinder to fully apply the brakes.

2. For use in a hydraulic braking system having brake actuating cylinders, a master cylinder in communication therewith, and a pedal for operating the master cylinder to displace fluid to the brake actuating cylinders, means for insuring sufficient displacement of fluid during the pedal stroke to operate the brake actuating cylinders comprising an auxiliary master cylinder connected directly to the hydraulic system between the master cylinder and the brake actuating cylinders, a one-way check valve between the auxiliary master cylinder and the hydraulic system permitting the flow of fluid from the auxiliary master cylinder to the hydraulic system but preventing flow in the reverse direction, a vacuum operated power device adapted to actuate said auxiliary master cylinder to force additional fluid directly into said brake actuating cylinders, and valve mechanism arranged to cause operation of said power device whenever the brake pedal moves more than a predetermined distance from released position.

3. For use in a hydraulic braking system having brake actuating cylinders, a master cylinder in communication therewith, and a pedal for operating the master cylinder to displace fluid to the brake actuating cylinders, means for insuring sufficient displacement of fluid during the pedal stroke to operate the brake actuating cylinders comprising an auxiliary master cylinder connected directly to the hydraulic system between the master cylinder and the brake actuating cylinders, a one-way check valve between the auxiliary master cylinder and the hydraulic system permitting the flow of fluid from the auxiliary master cylinder to the hydraulic system but preventing flow in the reverse direction, a vacuum operated power device adapted to actuate said auxiliary master cylinder to force additional fluid directly into said brake actuating cylinders, and valve mechanism arranged to cause operation of said power device whenever the brake pedal moves more than a predetermined distance from released position, said valve mechanism being mechanically connected to the pedal and having gradual opening and closing movement to permit various shades of severity in the operation of the power device.

4. For use in a hydraulic braking system having brake actuating cylinders, a master cylinder in communication therewith, and a pedal for operating the master cylinder to displace fluid to the brake actuating cylinders, means for insuring sufficient displacement of fluid during the pedal stroke to operate the brake actuating cylinders comprising an auxiliary master cylinder connected to the hydraulic system between the master cylinder and the brake actuating cylinders, a one-way check valve between the auxiliary master cylinder and the hydraulic system permitting the flow of fluid from the auxiliary master cylinder to the hydraulic system but preventing flow in the reverse direction, a power device adapted to actuate said auxiliary master cylinder, valve mechanism arranged to actuate said power device, and electrical means controlling the valve mechanism including a switch responsive to a predetermined movement of the pedal, the arrangement being such that movement of the pedal beyond the point at which full braking is ordinarily accomplished causes the valve mechanism to actuate the power device, thereby displacing additional fluid from the auxiliary master cylinder into the hydraulic system to conserve pedal travel.

5. For use in a hydraulic braking system having brake actuating cylinders, a master cylinder in communication therewith, and a pedal for operating the master cylinder to displace fluid to the brake actuating cylinders, means for insuring sufficient displacement of fluid during the pedal stroke to operate the brake actuating cylinders comprising an auxiliary master cylinder connected to the hydraulic system between the master cylinder and the brake actuating cylinders, a one-way check valve between the auxiliary master cylinder and the hydraulic system permitting the flow of fluid from the auxiliary master cylinder to the hydraulic system but preventing flow in the reverse direction, an automatically reversing multiple stroke power device adapted to actuate said auxiliary master cylinder, valve mechanism arranged to actuate said power device, and electrical means controlling the valve mechanism including a switch responsive to a predetermined movement of the pedal, the arrangement being such that movement of the pedal beyond the point at which full braking is ordinarily accomplished causes the valve mechanism to actuate the power device, thereby pumping additional fluid from the auxiliary master cylinder into the hydraulic system to conserve pedal travel.

6. For use in a hydraulic braking system having a motor which exerts applying force on the brakes, a master cylinder, a conduit interconnecting the master cylinder and motor, and an operator operated member for actuating the master cylinder to displace fluid to the motor, means for insuring sufficient displacement of fluid during the stroke of the aforesaid member to operate the motor comprising an auxiliary master cylder, a conduit connecting the auxiliary master cylinder directly to the aforementioned conduit, a one-way check valve in the last-enumerated conduit which permits the flow of fluid from the auxiliary master cylinder to the first-mentioned conduit but prevents flow in the reverse direction, a differential air pressure power device adapted upon emergency to actuate said auxiliary master cylinder, said power device normally remaining in released position during application of the brakes by the first-mentioned master cylinder, and valve mechanism arranged to actuate said power device to force additional fluid into the brake applying motor, said valve mechanism being controlled by movement of the operator operated member, and being arranged to actuate the power device only when an unusually long stroke of the operator operated member fails to displace sufficient fluid from the first-mentioned master cylinder to fully apply the brakes.

7. For use in a hydraulic braking system having brake actuating cylinders, a master cylinder in communication therewith, and a pedal for operating the master cylinder to displace fluid to the brake actuating cylinders, means for insuring sufficient displacement of fluid during the pedal stroke to operate the brake actuating cylinders comprising an auxiliary master cylinder connected to the hydraulic system between the master cylinder and the brake actuating cylinders, a one-way check valve between the auxiliary master cylinder and the hydraulic system permitting the flow of fluid from the auxiliary master cylinder to the hydraulic system but preventing flow in the reverse direction, a power device adapted to actuate said auxiliary master cylinder, and valve mechanism controlled by movement of the pedal and arranged to actuate said power device, the arrangement being such that movement of the pedal beyond the point at which full braking is ordinarily accomplished causes the valve mechanism to actuate the power device, thereby displacing additional fluid from the auxiliary master cylinder into the hydraulic system to conserve pedal travel.

8. For use in a hydraulic braking system having brake actuating cylinders, a master cylinder in communication therewith, and a pedal for operating the master cylinder to displace fluid to the brake actuating cylinders, means for insuring sufficient displacement of fluid during the pedal stroke to operate the brake actuating cylinders comprising an auxiliary master cylinder connected to the hydraulic system between the master cylinder and the brake actuating cylinders, a one-way check valve between the auxiliary master cylinder and the hydraulic system permitting the flow of fluid from the auxiliary master cylinder to the hydraulic system but preventing flow in the reverse direction, an automatically reversing multiple stroke power device adapted to actuate said auxiliary master cylinder and valve mechanism controlled by movement of the pedal and arranged to actuate said power device, the arrangement being such that movement of the pedal beyond the point at which full braking is ordinarily accomplished causes the valve mechanism to actuate the power device, thereby pumping additional fluid from the auxiliary master cylinder into the hydraulic system to conserve pedal travel.

EARL R. PRICE.

REFERENCES CITED

The following references are of record in the file of this patent:

UNITED STATES PATENTS

| Number | Name | Date |
|---|---|---|
| 1,885,580 | Bradbury | Nov. 1, 1932 |
| 2,328,637 | Freeman | Sept. 7, 1943 |